United States Patent [19]

Gebhardt

[11] Patent Number: 5,450,945
[45] Date of Patent: Sep. 19, 1995

[54] INTERMEDIATE ROLLER FOR DRIVING CARRYING ROLLERS OF AN ACCUMULATING ROLLER CONVEYOR

[75] Inventor: Günter Gebhardt, Sinsheim, Germany

[73] Assignee: Gebhardt Fördertechnik GmbH, Sinsheim, Germany

[21] Appl. No.: 280,867

[22] Filed: Jul. 26, 1994

[30] Foreign Application Priority Data

Jul. 28, 1993 [DE] Germany ............... 9311269 U

[51] Int. Cl.$^6$ ............................................. B65G 13/06
[52] U.S. Cl. .................................. 198/791; 198/789
[58] Field of Search ............... 198/780, 782, 789, 791; 474/161

[56] References Cited

U.S. PATENT DOCUMENTS

| | | | |
|---|---|---|---|
| 4,121,709 | 10/1978 | Gebhardt | 198/791 X |
| 4,172,519 | 10/1979 | Leach | 198/791 X |
| 4,266,660 | 5/1981 | Herman | 198/791 X |
| 4,325,474 | 4/1982 | Rae | 198/791 X |
| 4,416,650 | 11/1983 | Wilkins | 198/789 X |
| 5,183,150 | 2/1993 | Chary et al. | 198/791 X |

*Primary Examiner*—James R. Bidwell
*Attorney, Agent, or Firm*—Anderson Kill Olick & Oshinsky

[57] ABSTRACT

An intermediate roller for driving a carrying roller of an accumulating roller conveyor and including a sprocket wheel for engaging a chain of the accumulating roller conveyor, a mating gear for engaging a gear connected with the carrying roller, the mating gear being arranged coaxially with the sprocket wheel and being fitted together with the sprocket wheel, with the sprocket wheel and the mating gear having cooperating form-locking elements defining a chamber for receiving a damping element for providing a limited circumferential backlash between the sprocket wheel and the mating gear.

34 Claims, 5 Drawing Sheets

INTERMEDIATE ROLLER FOR DRIVING CARRYING ROLLERS OF AN ACCUMULATING ROLLER CONVEYOR

BACKGROUND OF THE INVENTION

The present invention relates to an intermediate roller for driving carrying rollers of an accumulating roller conveyor. An accumulating roller conveyor is a conveyor that includes sectionally driven carrying rollers on which articles are transported. During their transportation, the articles act on a sensing element projecting in the conveyor path. The sensing element controls engagement or disengagement of the elements of a conveyor drive for changing the conveyor output in accordance with local conditions.

There exist accumulating roller conveyors which include an intermediate roller comprising a sprocket wheel, which engages a circulating chain. The driven wheel, which is drivingly connectable with the carrying roller, can be formed as a gear. This results in a twofold form-locking motion transmission. On one hand, such motion transmission advantageously insures a reliable and efficient transportation of articles but, on the other hand, it may cause a detrimental forcible slippage between the engaged drive elements if the conveying of articles is blocked.

The latter may result in the damage of conveyor parts and/or the articles, especially with a high power input. Further, during connection of the sprocket wheel with the driven wheel, difficulties exist in bringing the teeth of the two parts into engagement with each other, and a noticeable impact of teeth on each other can be observed.

German Patent No. 2,650,205 which discloses an accumulating roller conveyor, discloses a concept which insures a substantial insensitivity to disturbances during the starting period and, at the same time, provides for a high constant transmission of drive forces.

In German Patent No. 2,650,225, a combination of safety clutches and special toothing provides for a reliable overload protection during engagement and disengagement of form-locking parts with which drive force tansmission is effected.

German Patent No. 2,650,205 discloses an accumulating roller conveyor in which an intermediate roller, formed as a sprocket wheel, drives the article-carrying rollers and is displaced between its drive and free-running positions by a linkage which cooperates with a sensing element projecting in the conveyor path.

According to the German patent, the outer surface and the hub of the carrying roller, which is driven by the intermediate roller, form, in a per se known manner, a slide bearing, and the drive connection between the intermediate roller and the carrying roller is provided by flattened toothing.

In this accumulating roller conveyor, good results are achieved with regard to force transmission. However, with regard to the start, i.e., the time at which the carrying roller is set in rotation, start impacts can still be present.

Accordingly, an object of the invention is to provide an intermediate roller which would insure that the forces, generated at the beginning of driving of the conveyor, are dampened.

SUMMARY OF THE INVENTION

This and other objects of the invention are achieved by providing an intermediate roller comprising a sprocket wheel for engaging a chain of the accumulating roller conveyor, and a mating gear for engaging a gear connected with the carrying roller and arranged coaxially with and fitted together with the sprocket wheel, with the sprocket wheel and the mating gear having cooperating form-locking elements defining at least one chamber for receiving a damping element for providing at least a limited circumferential backlash between the sprocket wheel and the mating gear.

The intermediate roller, according to the present invention, insures a reliable conveying and pressureless accumulation of conveyed articles.

The sprocket wheel and the mating gear form together a slide bearing which provides for limited relative rotation therebetween. The limitation of their mutual relative rotation is insured by appropriate form-locking elements, which engage each other after the limited relative rotation between the two parts, the sprocket wheel and the mating gear. The delayed engagement of the form-locking elements, upon fitting of the two parts into each other, is insured by the appropriate geometry of the cooperating form-locking elements. To this end, the corresponding form-locking elements of the sprocket wheel and the mating gear are so dimensioned, that their thickness is less than the desired length of the relative rotation path.

The cooperating form-locking elements of the sprocket wheel and the mating gear form chambers the volume of which is reduced or increased during the relative rotation of the sprocket wheel and the mating gear.

According to the invention, damping elements are placed in these chambers. These elements are formed of a compressible material. During run-on of the rollers, the damping element is compressed due to the relative rotation of the sprocket wheel and the mating gear, and absorbs the "starting impact". The forces generated during the start are transmitted to the damping element and slightly compress it until form-locking is obtained.

According to one embodiment of the invention, the sprocket wheel is provided, on a side thereof adjacent to the mating gear, with a coaxial cylindrical bearing shoulder, which has a diameter smaller than the dedendum diameter of the sprocket wheel. The sprocket wheel hub is formed as a sleeve having an outer diameter smaller than the diameter of the bearing shoulder.

The form-locking elements are arranged on the bearing shoulder concentrically to the axis of the sprocket wheel. Preferably, the form-locking elements extend transverse to the bearing shoulder and are formed as webs, with the upper surface of the form-locking elements being somewhat set back with respect to the upper surface of the hub.

The sprocket wheel, the bearing shoulder, the hub, and the form-locking element are preferably formed as a one-piece part made of a plastic material. However, the hub may also be formed as a separate sleeve subsequently assembled with the sprocket wheel proper.

The mating gear is formed as a hollow body and has, at one side thereof, an opening communicating with the hollow space, through which the bearing shoulder and form-locking elements of the sprocket wheel are inserted. That provides for coaxial arrangement of the sprocket wheel and the mating gear. The side of the mating gear adjacent to the sprocket wheel is closed with an end wall through which a bore for receiving a bearing extends, in which bore the hub of the sprocket wheel is received.

Inside of the hollow space of the mating gear concentrically to the axis of the mating gear, there are provided radially extending, with respect to the bearing bore, form-locking elements. Preferably, the form-locking elements are formed as webs extending transverse to the end wall.

As in the sprocket wheel, the upper surface of the webs is set back with regard to the upper surface of the mating gear opening. The inner surfaces of the form-locking elements of the mating gear are aligned with the bearing bore so that both have substantially the same inner diameter. The mating gear and its form-locking elements are preferably formed as a one-piece part made of a plastic material.

The inner surfaces of the form-locking elements of the mating gear serve as bearing shell parts for the hub of the sprocket wheel. The inner diameter of the hollow space of the mating gear serves as a bearing shell which receives the bearing shoulder of the sprocket wheel and its form-locking elements. Thus, the two parts, the sprocket wheel and the mating gear, cooperate with each other to drive the carrying roller, while a limited relative rotation therebetween is provided by appropriate dimensioning of their form-locking elements, which form-lockingly engage each other after the limited relative rotation of two parts took place. This became possible by inserting damping elements between the form-locking elements of the two parts.

BRIEF DESCRIPTION OF THE DRAWINGS

The objects and features of the present invention will become more apparent, and the invention itself will be best understood, from the following detailed description of the preferred embodiment when read with reference to the accompanying drawings, wherein.

DETAILED DESCRIPTION OF THE PREFERRED EMBODIMENT

Figure 1:
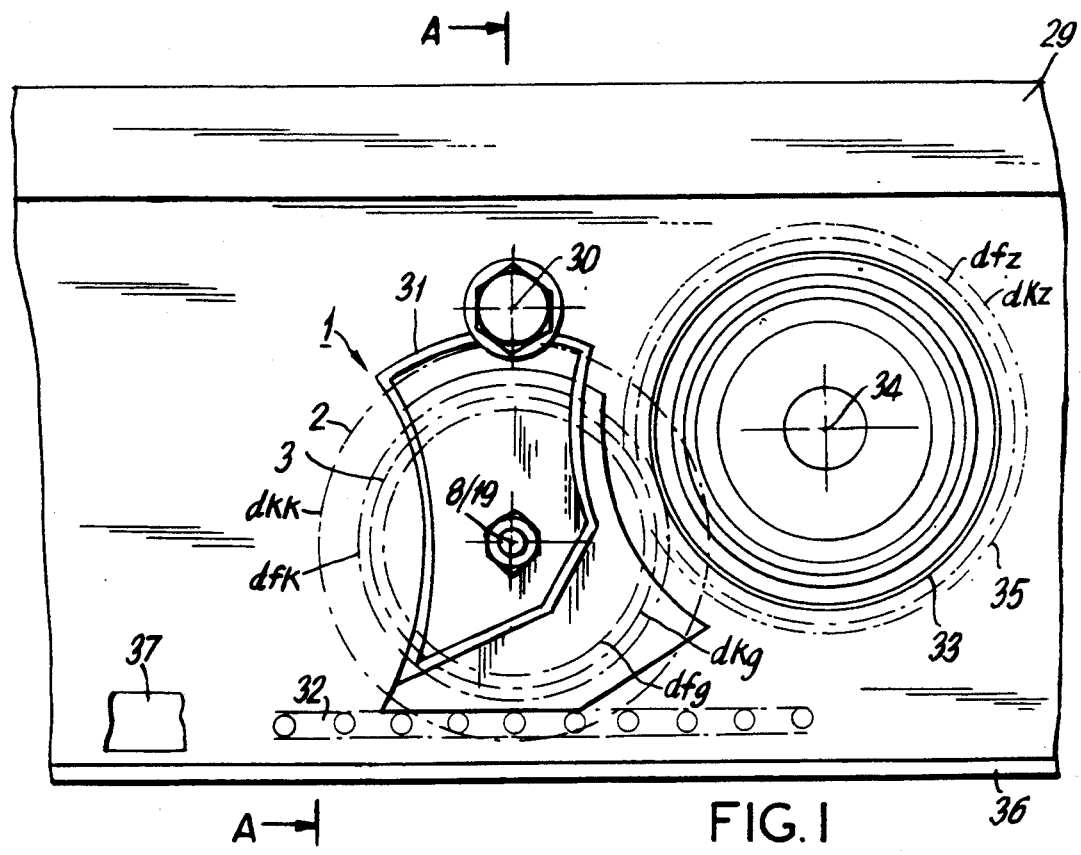
FIG. 1 is an interior view of a frame for housing an intermediate roller, according to the present invention.
Figure 2:
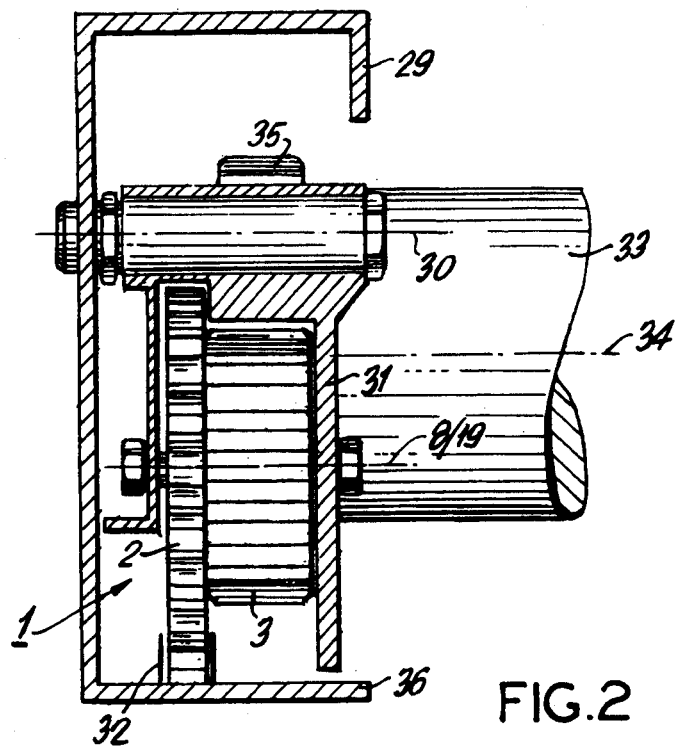
FIG. 2 is a cross-sectional view along line A—A in FIG. 1.

FIGS. 1 and 2 show an intermediate roller 1, according to the present invention, which is mounted in an accumulating roller conveyer. As shown in FIG. 1, a frame 29 for housing the intermediate roller 1 is provided on the inner side of the accumulating roller conveyer.

The accumulating roller conveyor is formed of two parallel frames 29 between which a carrying roller 33 is rotatably supported. The carrying roller is supported on an axle 34 on which a gear 35 is also mounted. For simplicity, the gear 35 is designated with its addendum "dkz" and dedendum "dfz" circles, which are shown with dash-dot lines.

The axle 34 is fixed in the frame 29, and the carrying roller 33 and the gear 35 are rotatably mounted on the axle 34. A transporting means, a chain 32, is continuously movable in the space between the carrying roller 33 and the gear 35 and a lower flange 36 of the frame 29. A sprocket wheel 2, which forms a part of the intermediate roller 1, engages the chain 32. For simplicity, the sprocket wheel 2 in FIG. 1 is also designated with its addendum "dkk" and dedendum "dfk" circles shown with dash-dot lines.

The intermediate roller 1 also includes a mating gear 3 which engages the gear 35. The mating gear 3, like the sprocket wheel 2 and the gear 35, is designated with its addendum "dkg" and dedendum "dfg" circles likewise shown with dash-dot lines.

The sprocket wheel 2 and the mating gear 3 together form the intermediate roller 1. The intermediate roller 1, together with combined axles 8 and 19 of the sprocket wheel 2 and the mating gear 3, is rotatably supported inside a housing 31. The housing 31, together with the intermediate roller 1, formed of sprocket wheel 2 and the mating gear 3, is pivotable about a pivot axis 30. An adjusting member 37, which is actuated by a sensing element (not shown) arranged in the conveyor path of the accumulating conveyor and which is secured to the housing 31, provides for engagement and disengagement of the mating gear 3 of the intermediate roller 1 and the gear 35 of the carrying roller 33.

Figure 4:
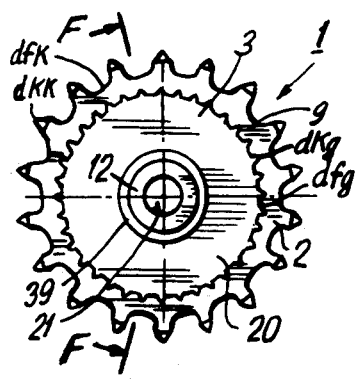
FIG. 4 is a view of the intermediate roller shown in FIG. 3 taken in the direction of arrow B.
Figure 3:
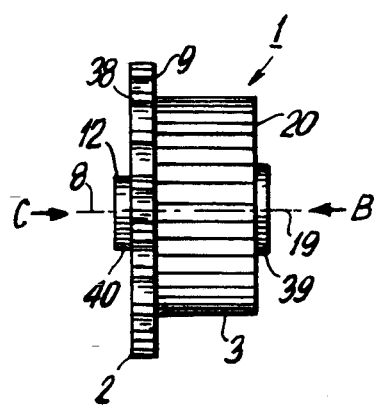
FIG. 3 is a side view of an intermediate roller, according to the present invention.
Figure 5:
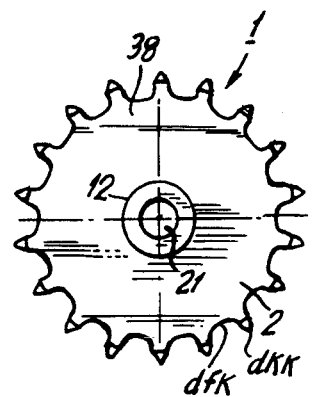
FIG. 5 is a view of the intermediate roller shown in FIG. 3 taken in the direction of arrow C.

Due to such cooperation of the driving and driven elements, the sprocket wheel 2 remains in constant engagement with the chain 32. FIGS. 3–5 shown the intermediate roller 1 taken out of the frame 29. As it has already been discussed above, the intermediate roller is formed of the sprocket wheel 2 and the mating gear 3. The sprocket wheel 2 and the mating gear 3 are formed as separate parts which fit into each other with their respective axes being coaxial with each other.

A hub 12 of the sprocket wheel 2 projects outwardly from an end surface 38 of the sprocket wheel 2 and forms an elongate bearing support. The hub 12 extends from an opposite end surface 9 of the sprocket wheel 2, which is adjacent to the mating gear 3, to serve as a bearing for the mating gear 3. The mating gear 3 is provided on its end wall 20, which is remote from the sprocket wheel 2, with a bearing shoulder 39. As a result, a portion of the hub 12 projecting from the end surface 38 of the sprocket wheel 2 defines an end collar 40, and another end collar is formed by the bearing shoulder 39 on the end wall 20 of the mating gear 3.

FIG. 4 shows that the addendum "dkk" of the sprocket wheel represents the largest dimension of the intermediate roller 1, and that the mating gear 3 or its addendum diameter "dkg" is located inside the dedendum diameter "dfk" of the sprocket wheel 2. In FIG. 4, the end surfaces of the hub 12 of the sprocket wheel 2 and the bearing shoulder 39 of the mating gear 3 are shown as surrounding the bearing bore 21.

Figure 6:
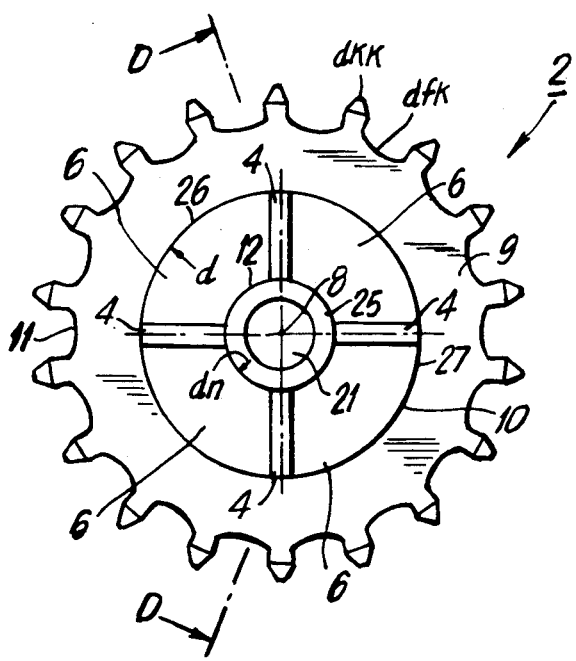
FIG. 6 is a front elevational view of a sprocket wheel.
Figure 7:
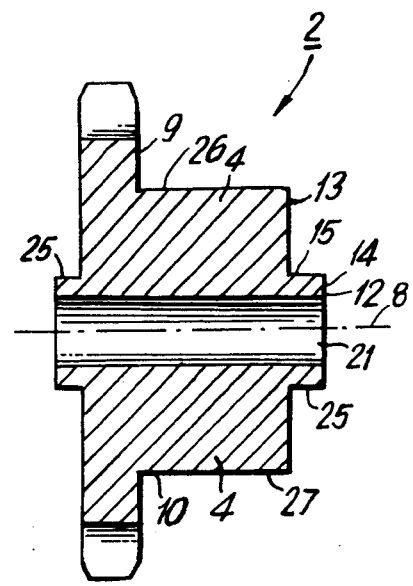
FIG. 7 is a cross-sectional view of the sprocket wheel shown in FIG. 6 taken along line D—D.

The sprocket wheel 2, which forms a part of the intermediate roller 1 according to the present invention, is shown in detail in FIGS. 6 and 7. The sprocket wheel 2 has, on an end surface 9 thereof, adjacent to the mating gear 3, a bearing shoulder 10 coaxial with the axis of the sprocket wheel 2. The diameter "d" of the bearing shoulder 10 is noticeably smaller than the diameter "dfk" of the dedendum 11 of the sprocket wheel 2. The hub 12 of the sprocket wheel 2 extends transversely to the bearing shoulder 10.

The hub 12 is formed as a bearing sleeve and is provided with a bore 21. The diameter "dn" of the hub is smaller than the diameter "d" of the bearing shoulder 10. The outer circumference 26 and the outer surface 27 define a plurality of separate form-locking elements 4 radially extending on the bearing shoulder 10 around the hub 12 and which form, in cooperation with respective elements of the mating gear 3, corresponding slide bearing elements.

In the embodiment shown in FIGS. 6 and 7, the form-locking elements 4 are formed as webs arranged transversely to the bearing shoulder 10. A step 15 is formed between an outer surface 13 of the form-locking elements 4 and an outer surface 14 of the hub 12. The form-locking elements 4 define respective chambers 6 therebetween, which will be discussed in more detail below.

Figure 8:
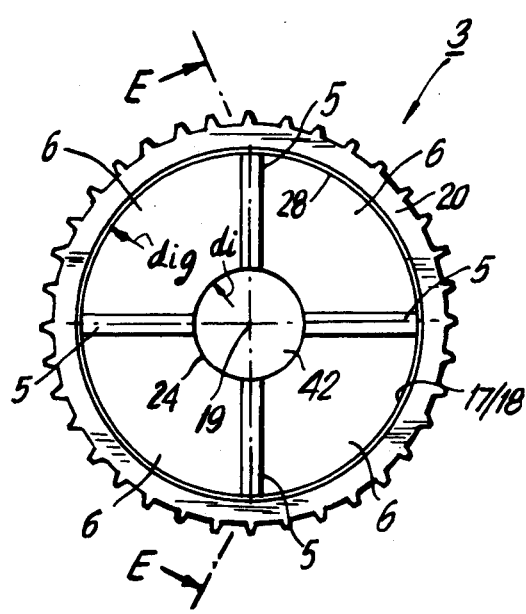
FIG. 8 is a front elevational view of a mating gear.
Figure 9:
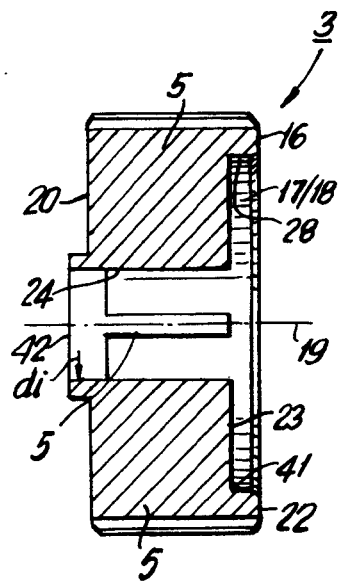
FIG. 9 is a cross-sectional view of the mating gear shown in FIG. 8 taken along line E—E in FIG. 8.

FIGS. 8 and 9 show an embodiment of the mating gear 3 which forms part of the intermediate 1, according to the present invention. The mating gear 3, as clearly shown in the drawings, is a hollow body. The mating gear 3 has, at a side 16 thereof adjacent ot the sprocket wheel 2, a hollow space 17 communicating with an opening 18. About the axis of the mating gear 3 in the end wall 20 of the mating gear 3, there are provided, transverse to the end wall 20, webs defining form-locking elements 5 of the mating gear 3.

The form-locking elements 5 also form separate chambers 6. A step 41 is formed between the outer surface 22 of the mating gear 3 and the outer surface 23 of the form-locking elements 5. The inner surfaces 24 of the form-locking elements 5 are aligned with an inner diameter "di" of the mating gear bore 42. The inner circumference 28 of the mating gear 3 is aligned with an outer circumference 27 of the form-locking elements 4 of the sprocket wheel 2 and to an outer circumference 26 of the bearing shoulder 10. The inner surfaces 24 of the form-locking elements 5 correspond to a circumference 25 of the hub 12 of the sprocket wheel 2. Thereby, a sliding bearing is formed.

Figure 10:
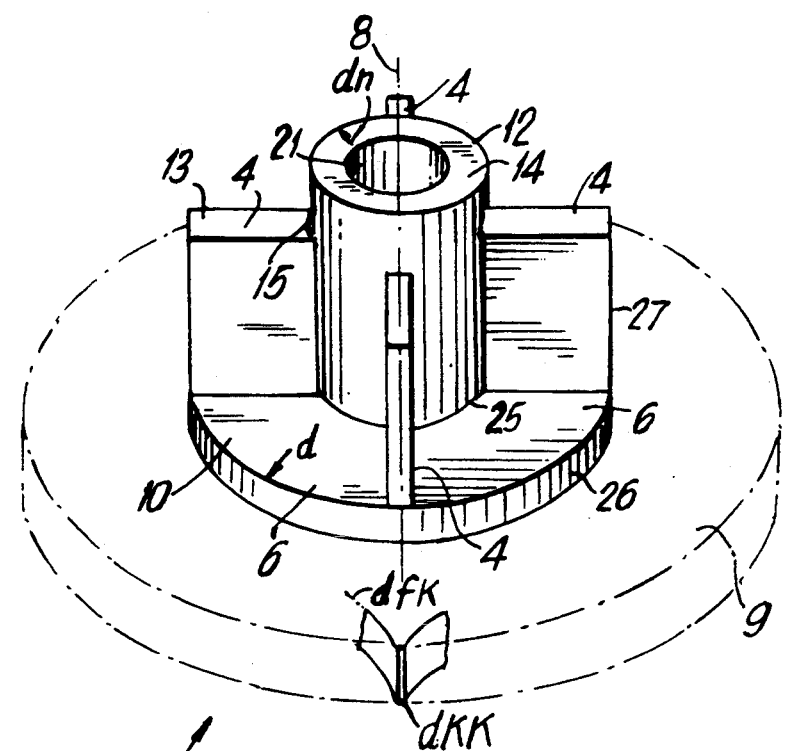
FIG. 10 is a perspective view of the sprocket wheel.
Figure 11:
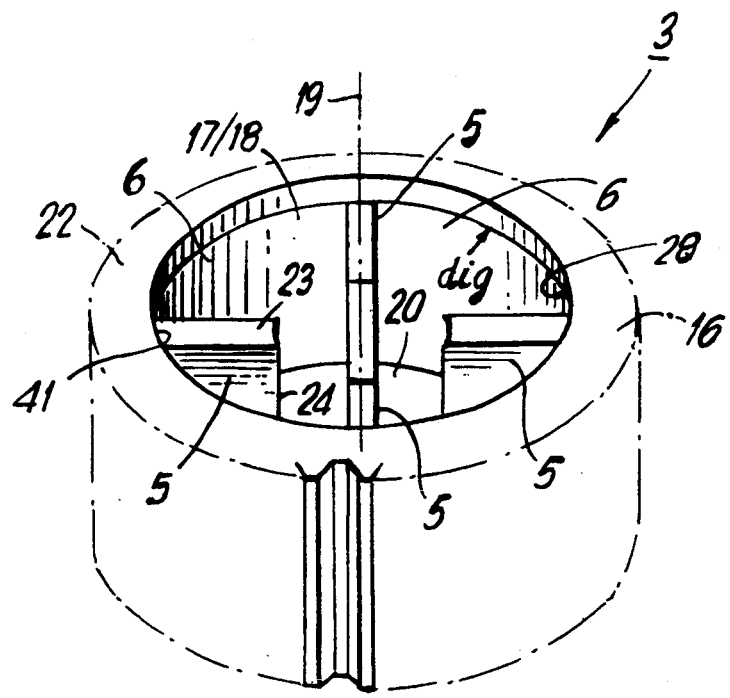
FIG. 11 is a perspective view of the mating gear.
Figure 12:
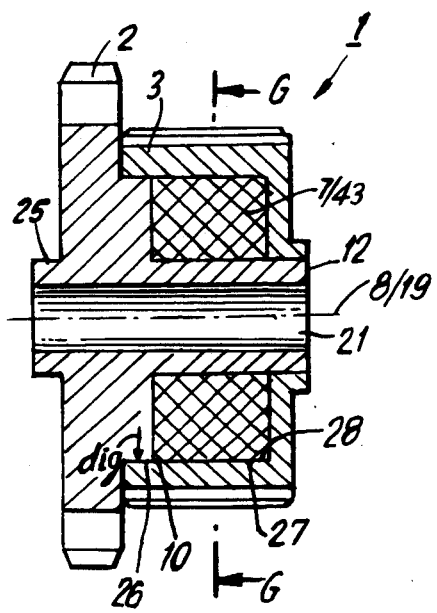
FIG. 12 is a cross-sectional view of the intermediate roller shown in FIG. 4 taken along line F—F and showing the connection of the sprocket wheel and the mating gear, which together form the intermediate roller according to the present invention.

FIGS. 10 and 11 show, respectively, perspective views of the sprocket wheel 2 and the mating gear 3, and FIG. 12 shows a cross-sectional view of the sprocket wheel 2 and the mating gear 3 in their assembled condition in which they form the intermediate roller 1, according to the present invention. In FIGS. 10–12, elements identical with respective elements shown in FIGS. 1–9 are designated with the same reference numerals. In FIG. 12, reference numeral 7 designates a damping element.

Figure 13:
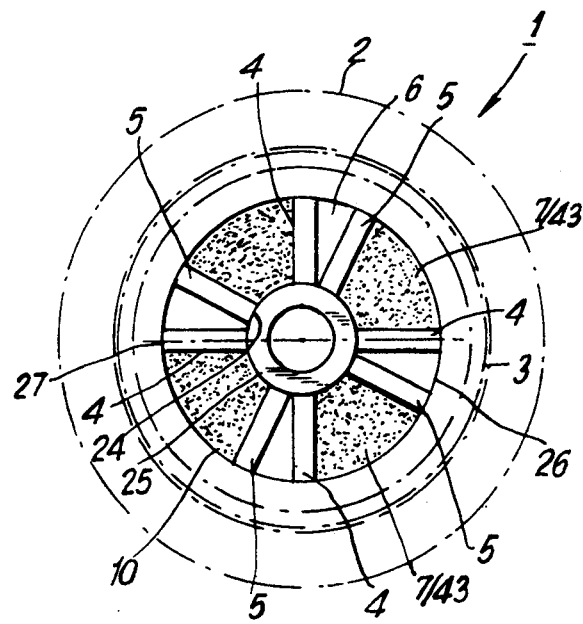
FIG. 13 is a cross-sectional view of the intermediate roller shown in FIG. 12 taken along line G—G.

FIG. 13, which represents a cross-sectional view of the intermediate roller 1 shown in FIG. 12, shows a relative position and a circumferential backlash of the sprocket wheel 2 and the mating gear 3.

In the assembled condition, the sprocket wheel 2 and the mating gear 3 define spaces 43 in which the damping elements 7 are located. In the position shown in FIG. 13, the damping element 7 is not compressed as no power transmission takes place. When the mating gear 3 engages the gear 35 of the carrying roller 33, the form-locking elements 4 and 5 are rotated toward each other until a form-locking connection is obtained.

In the absence of the damping element 7, the form-locking elements 4 and 5 would have impacted on each other. The damping element 7 dampens the power transmission force applied to the form-locking elements 4 and 5, and no deceleration takes place so that the driving movement is transmitted without any delay.

Figure 13A:
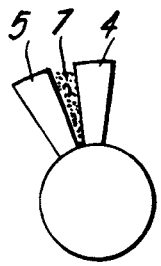
FIG. 13a is a view showing a portion of an intermediate roller similar to the roller shown in FIG. 13.

As shown in FIG. 13a, the form-locking elements 4 and 5 can have a conical shape which insures a uniform application of compression forces to the damping element.

The intermediate roller, according to the present invention, which drives the carrying roller of an accumulating roller conveyor, insures reliable conveying and pressureless accumulation of conveyed articles by including a damping element between form-locking elements of the sprocket wheel and the mating gear, which together form the intermediate roller which damping element eliminates starting impact forces, thereby preventing any drive deceleration.

While the present invention was shown and described with reference to the preferred embodiment, various modifications will be apparent to those skilled in the art and, therefore, it is not intended that the invention be limited to the disclosed embodiment and/or details thereof, and departures can be made therefrom within the spirit and scope of appended claims.

What is claimed is:

1. An intermediate roller for driving carrying rollers of an accumulating roller conveyor, said intermediate roller having a first, driving position in which it drives the carrying rollers, and a second, free-running position, said intermediate roller comprising:

a sprocket wheel for engaging a chain of the accumulating roller conveyor;

a mating gear for engaging a gear connected with the carrying roller, said mating gear being arranged coaxially with said sprocket wheel and being fitted together with said sprocket wheel, and said sprocket wheel and said mating gear having cooperating form-locking elements defining at least one chamber; and a damping element receivable in said at least one chamber for providing at least a limited circumferential backlash between said sprocket wheel and said mating gear.

2. An intermediate roller as set forth in claim 1, wherein said sprocket wheel has, at a side thereof adjacent to said mating gear, a bearing shoulder coaxial with an axis of said sprocket wheel.

3. An intermediate roller as set forth in claim 2, wherein said bearing shoulder has a cylindrical shape.

4. An intermediate roller as set forth in claim 3, wherein said bearing shoulder has a diameter smaller than a dedendum of said sprocket wheel.

5. An intermediate roller as set forth in claim 2, wherein said sprocket wheel has a hub formed as a sleeve.

6. An intermediate roller as set forth in claim 5, wherein said hub has a diameter smaller than a diameter of said bearing shoulder.

7. An intermediate roller as set forth in claim 5, wherein said hub and said bearing shoulder are coaxial.

8. An intermediate roller as set forth in claim 5, wherein the form-locking elements of said sprocket wheel are arranged on said bearing shoulder concentrically therewith.

9. An intermediate roller as set forth in claim 8, wherein said form-locking elements are comprised of webs extending transverse to said bearing shoulder.

10. An intermediate roller as set forth in claim 8, wherein said form-locking elements have an outer surface, and said hub has an outer surface which defines, together with said outer surface of said form-locking elements, a step.

11. An intermediate roller as set forth in claim 2, wherein the form-locking elements of said sprocket wheel comprise four separate radially extending webs provided on said bearing shoulder concentrically therewith.

12. An intermediate member as set forth in claim 5, wherein said sprocket wheel, said bearing shoulder, said hub, and the form-locking elements of said sprocket wheel form a one-piece part.

13. An intermediate member as set forth in claim 5, wherein said one-piece part is formed of a plastic material.

14. An intermediate member as set forth in claim 1, wherein said mating gear is formed as a hollow member.

15. An intermediate roller as set forth in claim 1, wherein said mating gear has a hollow space and, at a side thereof adjacent to said sprocket wheel, an opening communicating with said hollow space.

16. An intermediate roller as set forth in claim 1, wherein said mating gear has a bearing bore extending through an end wall of said mating gear, which is remote from the sprocket wheel.

17. An intermediate roller as set forth in claim 1, wherein said mating gear has a hollow space, and the form-locking elements of said mating gear comprise radially extending separate form-locking elements arranged inside said hollow space concentrically relative to an axis of said mating gear.

18. An intermediate roller as set forth in claim 17, wherein said separate form-locking elements comprise webs provided on an end wall of said mating gear adjacent to said sprocket wheel transverse to said end wall.

19. An intermediate roller as set forth in claim 18, wherein said mating gear has an outer surface, and said webs have an outer surface defining, together with the outer surface of said mating gear, a step.

20. An intermediate roller as set forth in claim 1, wherein said mating gear has a bearing bore having an inner diameter, and the form-locking elements of the mating gear have an inner surface aligned with said inner diameter of said bearing bore.

21. An intermediate roller as set forth in claim 1, wherein said mating gear has an end wall, and the form-locking elements of said mating gear are formed integrally with said end wall.

22. An intermediate roller as set forth in claim 21, wherein said mating gear, together with said form-locking elements, is formed of a plastic material.

23. An intermediate roller as set forth in claim 1, wherein said mating gear has a hollow space, and wherein the form-locking elements of said mating gear comprise four separate radially extending webs arranged in said hollow space.

24. An intermediate roller as set forth in claim 1, wherein said sprocket wheel has a hub, and said mating gear has a bearing bore for receiving said hub.

25. An intermediate roller as set forth in claim 1, wherein said sprocket gear has a hub having an outer circumference, and wherein the form-locking elements of said mating gear are formed as bearing shell parts aligned with said outer circumference of said hub.

26. An intermediate roller as set forth in claim 1, wherein the form-locking elements of said sprocket wheel have an outer surface, wherein said mating gear has an inner diameter defining a bearing shell, wherein said sprocket wheel has a bearing shoulder having an outer circumference, and wherein said outer surface, said inner diameter and said outer circumference are aligned.

27. An intermediate roller as set forth in claim 1, wherein said sprocket wheel has a hub having an outer circumference, wherein the form-locking elements of said sprocket wheel have an outer surface, wherein said sprocket wheel has a bearing shoulder having an outer circumference, wherein the form-locking elements of said mating gear have an inner surface, wherein said mating gear has an inner circumference, and wherein said inner surface, said inner circumference, said outer surface and the outer circumferences of said hub and said bearing shoulder form together a slide bearing.

28. An intermediate roller as set forth in claim 1, wherein the cooperating form-locking elements of said sprocket wheel and said mating gear form a plurality of chambers for receiving a respective plurality of damping elements.

29. An intermediate roller as set forth in claim 1, wherein said damping element is formed of an elastic material.

30. An intermediate roller as set forth in claim 1, wherein said damping element is formed of a compressible material.

31. An intermediate roller as set forth in claim 1, wherein said sprocket wheel is constantly engaged with the chain of the accumulating roller conveyor.

32. An intermediate roller as set forth in claim 5, wherein said hub is a separate bearing bushing inserted into said sprocket wheel.

33. An accumulating roller conveyor comprising:
frame means;
carrying rollers;
a gear associated with a carrying roller;
an intermediate roller engageable with said gear for driving said carrying roller, said intermediate roller having a first, driving position in which it drives said carrying roller, and a second, free-running position, said intermediate roller comprising:
a sprocket wheel for engaging said chain of the accumulating roller conveyor;
a mating gear for engaging said gear associated with said carrying roller, said mating gear being arranged coaxially with said sprocket wheel and being fitted together with said sprocket wheel, and said sprocket wheel and said mating gear having cooperating form-locking elements defining at least one chamber, and
a damping element receivable in said at least one chamber for providing at least a limited circumferential backlash between said sprocket wheel and said mating gear; and means for pivotally supporting said intermediate roller on said frame.

34. An accumulating roller conveyor as set forth in claim 33, wherein said pivotally supporting means comprises a housing pivotally supported in said frame, said intermediate roller having a combined axle on which said intermediate roller is rotatably supported, and which is fixedly attached to said housing to provide for pivotal movement of said intermediate roller with said housing about a pivot axis of said housing.

* * * * *